US009826571B2

(12) United States Patent
Iyer et al.

(10) Patent No.: US 9,826,571 B2
(45) Date of Patent: Nov. 21, 2017

(54) MESH NODE ROLE DISCOVERY AND AUTOMATIC RECOVERY

(75) Inventors: Pradeep Iyer, Cupertino, CA (US); Santashil Palchaudhuri, Kolkata (IN); Shravan Kumar Mettu, San Francisco, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 362 days.

(21) Appl. No.: 13/174,236

(22) Filed: Jun. 30, 2011

(65) Prior Publication Data
US 2013/0003654 A1    Jan. 3, 2013

(51) Int. Cl.
*H04W 40/00* (2009.01)
*H04W 4/00* (2009.01)
*H04W 84/22* (2009.01)
*H04W 48/08* (2009.01)
*H04W 76/02* (2009.01)

(52) U.S. Cl.
CPC ........... *H04W 84/22* (2013.01); *H04W 40/00* (2013.01); *H04W 48/08* (2013.01); *H04W 76/028* (2013.01)

(58) Field of Classification Search
None
See application file for complete search history.

(56) References Cited

U.S. PATENT DOCUMENTS 8,312,519 B1 * 11/2012 Bailey et al. ............... 726/6
8,559,410 B2 * 10/2013 Kalika ............... H04N 21/4126
370/338

| 2006/0104230 | A1 * | 5/2006 | Gidwani ................. 370/328 |
| 2006/0193334 | A1 * | 8/2006 | Hazra et al. ............. 370/400 |
| 2007/0066306 | A1 * | 3/2007 | Cheng ..................... 455/445 |
| 2007/0127417 | A1 * | 6/2007 | Kalika ............ H04L 12/2456 370/338 |
| 2007/0189249 | A1 * | 8/2007 | Gurevich et al. ......... 370/338 |
| 2007/0206537 | A1 * | 9/2007 | Cam-Winget et al. ..... 370/331 |
| 2008/0065888 | A1 * | 3/2008 | Zheng et al. ............ 713/171 |
| 2008/0304427 | A1 * | 12/2008 | Biswas ............... H04L 41/04 370/255 |
| 2009/0010235 | A1 * | 1/2009 | Huh et al. ............... 370/338 |
| 2009/0116410 | A1 * | 5/2009 | Seok ..................... 370/255 |
| 2009/0323608 | A1 * | 12/2009 | Adachi et al. ........... 370/329 |
| 2011/0032913 | A1 * | 2/2011 | Patil et al. ............. 370/338 |
| 2011/0119360 | A1 * | 5/2011 | Kish et al. .............. 709/221 |

(Continued)

FOREIGN PATENT DOCUMENTS

CN         1627716 A   *  6/2005

*Primary Examiner* — Steve Young
(74) *Attorney, Agent, or Firm* — Hewlett Packard Enterprise Patent Department

(57) ABSTRACT

Embodiments of the present disclosure provide for configuring and managing mesh nodes during occasional failure of mesh nodes or addition of new mesh nodes. The disclosed system first determines whether a mesh node is a mesh portal or a mesh point. If it is a mesh portal, the mesh node will advertise its capacity as a mesh portal to other mesh nodes in the network. If it is a mesh point, the mesh node attempts to automatically recover connection to the wireless mesh network if it identifies a unique wireless network based on its associated network identifier. If more than one network identifiers are discovered, the mesh node delays establishing connection to the wireless mesh network until a selection is received.

30 Claims, 6 Drawing Sheets

(56) References Cited

U.S. PATENT DOCUMENTS

2011/0292925 A1* 12/2011 Ho .................... H04W 88/08
                                                    370/338
2012/0198434 A1* 8/2012 Dirstine ................ G06F 8/65
                                                    717/170

* cited by examiner

MESH NODE ROLE DISCOVERY AND AUTOMATIC RECOVERY

BACKGROUND OF THE INVENTION

The present disclosure relates to resource management and configuration in a wireless digital network. In particular, the present disclosure relates to role discovery and automatic over the air provisioning of a network device in a wireless mesh network (WMN).

Wireless digital networks, including wireless networks operating under IEEE 802.11 standards, are spreading in their popularity and availability. With such popularity, however, come problems of resource management and configuration. Specifically, when a network device joins a wireless mesh network after the network device starts up or reboots, the network device needs to be properly provisioned and configured in order to successfully become a member of a wireless mesh network. Typically, management and configuration of such network device is completed by an administrator manually. Such configuration of network devices in remote offices typically requires entering provisioning information (e.g., whether the network device is a mesh portal or a mesh point) as well as network configuration information (e.g., the virtual controller identifier corresponds to the wireless network to be joined). Therefore, such network device management and configuration process is inefficient and prone to errors from, e.g., human inputs.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to resource management and configuration in a wireless digital network and, particularly, to the role discovery and automatic over the air provisioning of mesh node in a mesh wireless network. Embodiments of the present disclosure provide a solution that requires little human intervention to configure and manage network devices in a mesh wireless network. With the solution provided herein, after a network device starts up or reboots, it will be provisioned as either a mesh portal or a mesh point. If it is provisioned as a mesh portal, it will start advertising its mesh portal capabilities to other mesh nodes in the wireless mesh network; and if it is provisioned as a mesh point, it will identify and automatically setup over the air connection to a corresponding wireless mesh network.

Computing Environment

Figure 1:
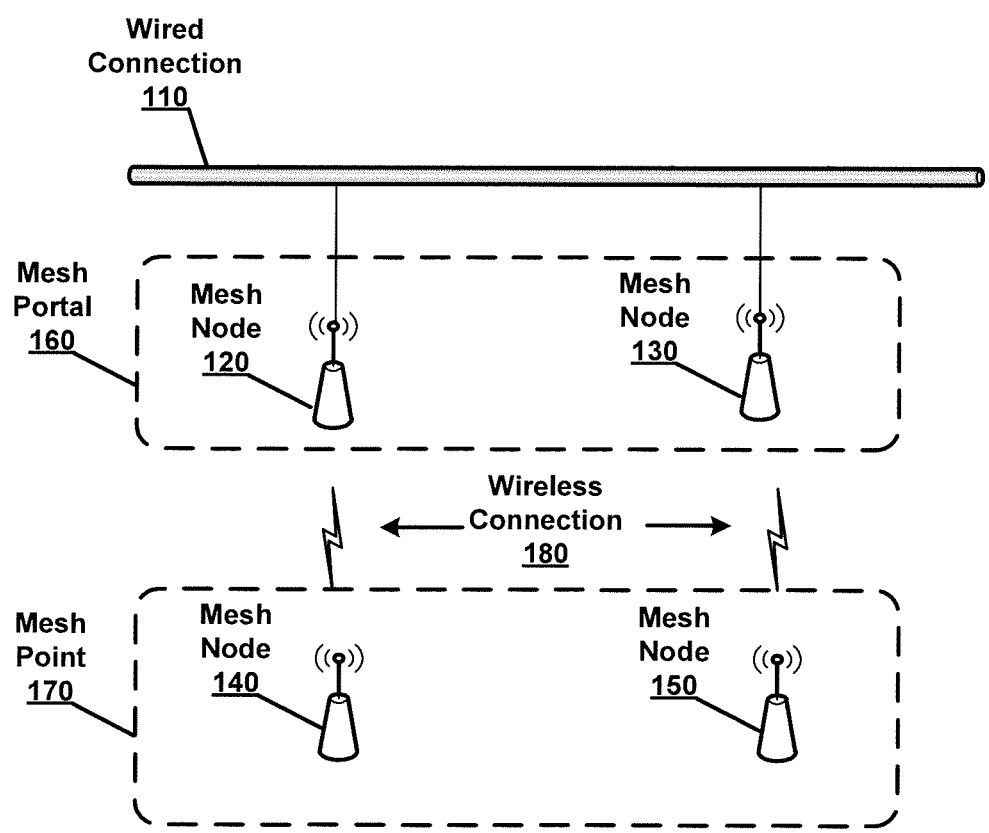
FIG. 1 shows a wireless mesh network environment according to embodiments of the present disclosure.

FIG. 1 shows a wireless digital network environment according to embodiments of the present disclosure. FIG. 1 includes mesh nodes 120 and 130, both of which are coupled to a wired network connection 110. Also, FIG. 1 includes mesh node 140, which is coupled to mesh node 120 via wireless connection 180, and mesh node 150, which is coupled to mesh node 130 via wireless connection 180.

Wired connection 110 can be any type of wired network connections through medium such as Ethernet cables, broadband cables, and/or fiber optics. Wireless connection 180 can be any type of wireless network connection, such as a wireless local area network (WLAN) under Institute of Electrical and Electronics Engineers (IEEE) 802.11 standards, a cellular wireless network, including cellular networks using Worldwide Interoperability for Microwave Access (WiMAX), 3GPP Long Term Evolution (LTE), 4G technologies, etc.

Wireless mesh network depicted in FIG. 1 provides a cost effective and dynamic high-bandwidth network over a specific coverage area. In a wireless mesh network infrastructure, an access point or a mesh network router may not be coupled to each other via wired network cables. Rather, the wireless mesh network is built of peer radio devices that are capable of communicating to each other through wireless communication exchanges. Note that mesh networking topology is a type of networking where each mesh node not only captures and disseminates its own data, but also serves as a relay for other mesh nodes. That is, each mesh node also collaborates to propagate the data in the wireless mesh network.

A wireless mesh network can be designed using a routing technique. With a routing technique, the message propagates along a path by hopping from one mesh node to another mesh node until the destination is reached. To ensure all paths' availability, a routing wireless mesh network needs to allow for continuous connections and reconfiguration around broken or blocked paths using, for example, self-healing algorithms.

Moreover, wireless mesh network architecture sustains signal strength by breaking long distances into a series of shorter hops. Intermediate mesh nodes not only boost signals, but also cooperatively make forwarding decisions based on their knowledge of the network. Therefore, wireless mesh network architecture can be designed carefully to provide high bandwidth, spectral efficiency, and economic advantage over coverage areas.

There are typically two types of mesh nodes in a wireless mesh network infrastructure—mesh portals and mesh points. A "mesh portal" generally refers to a mesh node that has a direct access to wired network, and is configured to function as a gateway to such wired network. For example, in FIG. 1, mesh nodes 120 and 130 are both mesh portals 160. A "mesh point" generally refers to any mesh node that does not have direct access to wired network, and has to connect to a mesh portal via one or more intermediate mesh nodes to get gateway access. For example, in FIG. 1, mesh nodes 140 and 150 are both mesh points 170.

Conventionally, wireless mesh networks have a relatively stable topology except for occasional failure of mesh nodes or addition of new mesh nodes. The path of traffic, being aggregated from a large number of end users, changes infrequently in a mesh wireless network. Practically, all traffic in a wireless mesh network is either forwarded to or from a gateway or a mesh portal that has wired network connection.

Embodiments of the present disclosure provide for an improved way of configuring and managing mesh nodes during the occasional failure of mesh nodes or addition of new mesh nodes. The disclosed system first determines whether a mesh node, which is either newly added to the network or rebooted after a failure, is a mesh portal or a mesh point. If it is a mesh portal, the mesh node will advertise its capacity as a mesh portal to other mesh nodes in the network. If it is a mesh point, the mesh node will attempt to automatically recover connection to the wireless mesh network if it can identify a unique wireless mesh network based on its associated identifier.

Mesh Node Role Discovery

Figure 2:
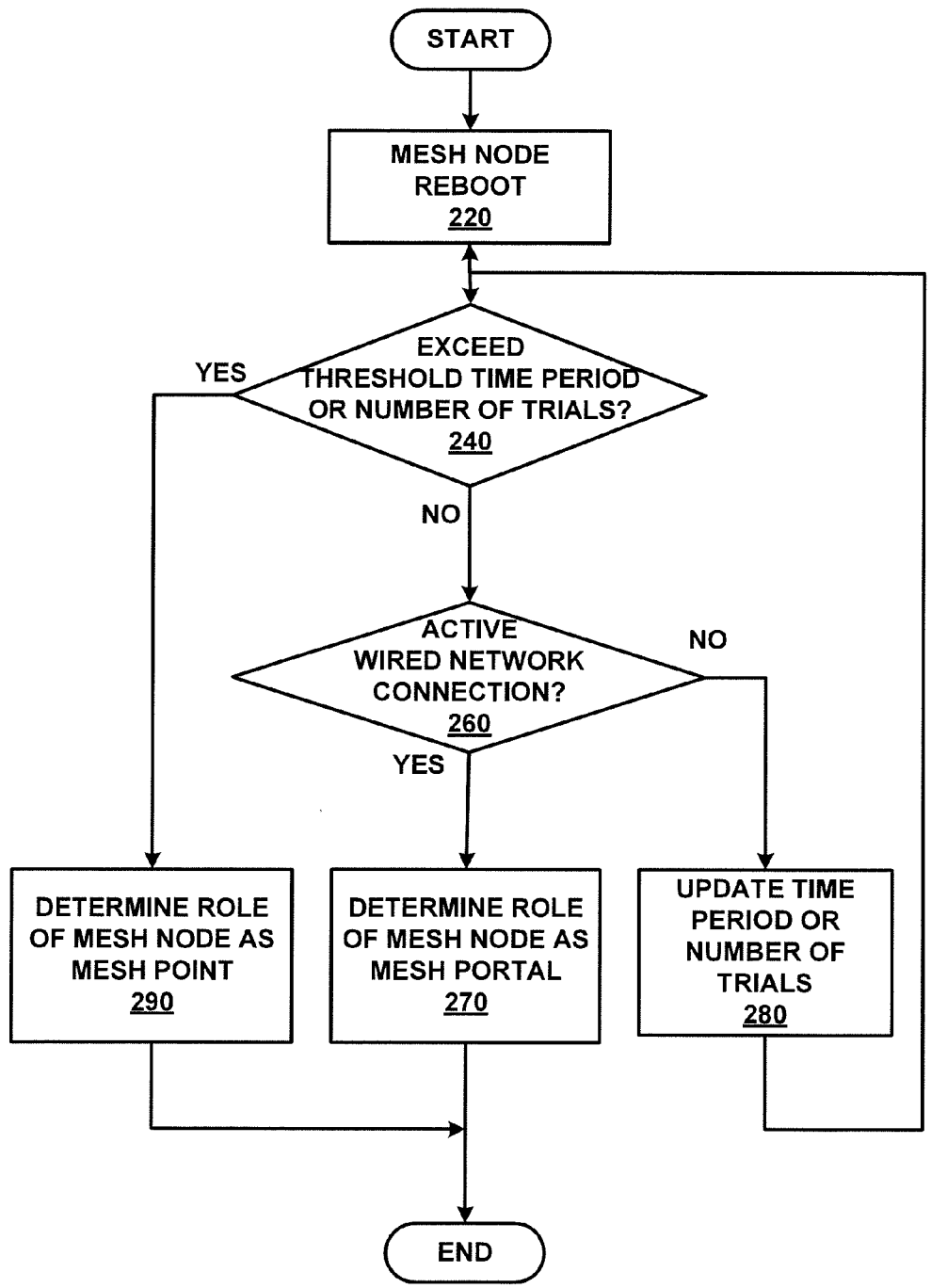
FIG. 2 shows a flowchart illustrating mesh node role discovery process according to embodiments of the present disclosure.

FIG. 2 shows a flowchart illustrating mesh node role discovery process. During operation, after a mesh node reboots (operation 220) after a failure or starts up and is ready to be added as an additional mesh node to a network (not shown), the system will determine whether a threshold amount of time has lapsed, namely whether a threshold time period has been exceed or expired, or a threshold number of trials has been reached (operation 240). In some embodiments, the system may determine based on both the amount of time lapsed and the number of trials reached. These threshold values are pre-defined in the system to allow for adequate time for wired network connection to be established by the mesh node after the network device is started up for a first time or rebooted.

If a pre-defined time period has lapsed and/or if the pre-defined number of trials has not been reached, the system further determines whether the network device corresponding to the mesh node has an active wired network connection (operation 260). In response to the determination that the mesh node has an active wired network connection, the system determines the role of the mesh node as a mesh portal (operation 270). Otherwise, the system updates its clock and/or the number of trials attempted as necessary (operation 280), and repeats the above determinations in operations 240 and/or 260.

If, however, the system determines that the threshold time period has lapsed or the pre-defined number of trials has been reached, and yet still no active wired network connection is detected, the system will determine the role of the mesh node as a mesh point (operation 290).

The system will automatically provision the mesh nodes based on the aforementioned determinations. If a mesh node is provisioned as a mesh portal, the mesh node will start advertising its mesh portal capabilities to other mesh nodes in the wireless mesh network, and thus facilitate other mesh nodes to gain access to wired network it connects to. If a mesh node is provisioned as a mesh point, the mesh node will attempt to connect to another intermediate mesh node via wireless communication exchanges, and connect to a mesh portal (and thus wired network) through one or more intermediate mesh nodes.

Mesh Node Over the Air Provisioning

Figure 3A:
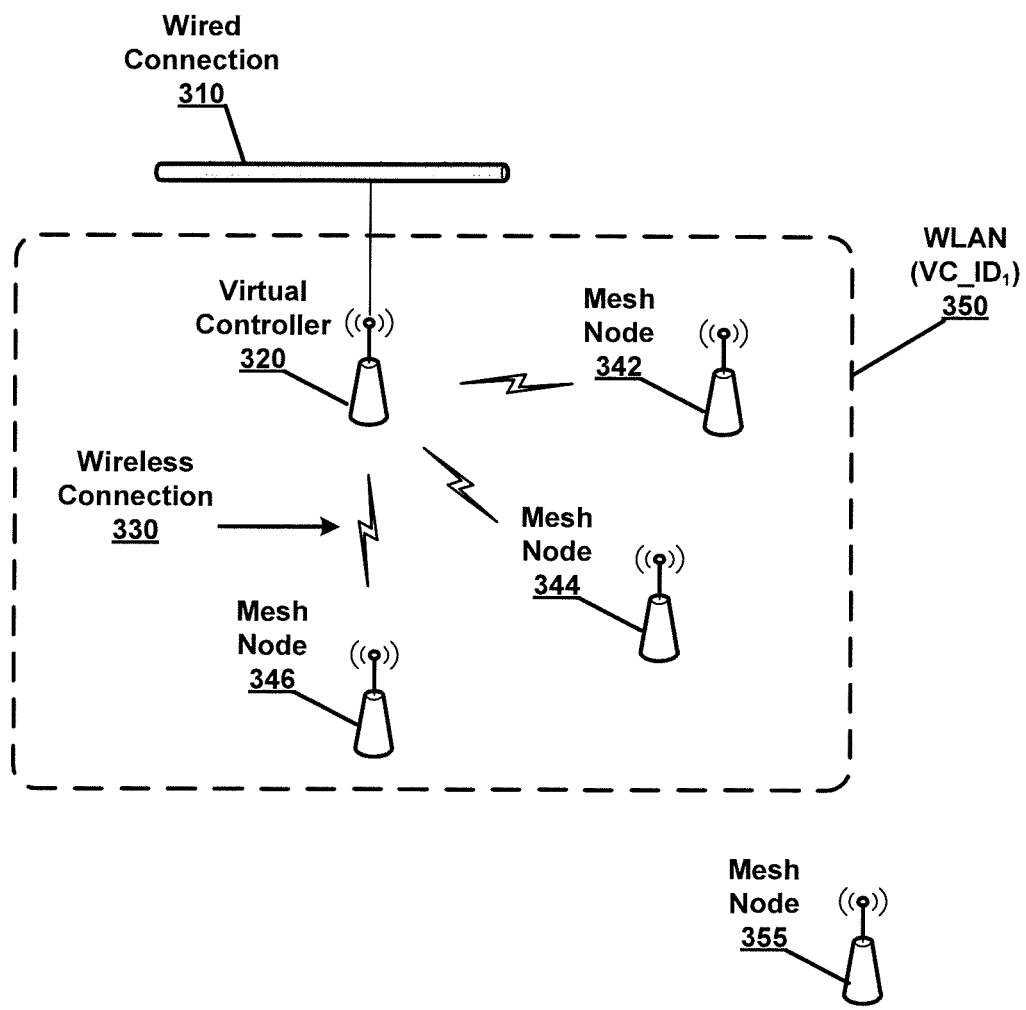
FIG. 3A is a block diagram showing an exemplary wireless mesh network environment for mesh node automatic over the air provisioning according to embodiments of the present disclosure.

FIG. 3A is block diagram showing an exemplary wireless mesh network environment for mesh node automatic over the air provisioning. FIG. 3A includes a plurality of mesh nodes 320, 342, 344, and 346, among which one mesh node is designated as a virtual controller 320. The mesh node designated as virtual controller 320 is a mesh portal having access to a wired network via wired connection 310. Moreover, mesh nodes 342-346 connect to the wired network through virtual controller 320, and are coupled to virtual controller 320 through a number of wireless network connections 330.

Unlike other mesh nodes 342-346, virtual controller 320 has additional processing capabilities, including capabilities to perform IEEE 802.1X authentications, automatic radio frequency management, centralized firmware and configuration management, to enable seamless growth, wireless security, multiple SSIDs with segregated user traffic and seamless stateful roaming. These capabilities can be achieved through distributed processing in a wireless network architecture, which includes a virtual controller 320. Note that although depicted as a regular mesh node in FIG. 3A, in some embodiments, virtual controller 320 can be a logical entity comprising one or more wireless network devices.

Virtual controller 320 periodically transmits beacon frames to other mesh nodes 342-346 to announce the presence of wireless local area network (WLAN) 350. A beacon frame is a management frame used in IEEE 802.11 based WLANs. It contains information about the network, including, for example, timestamp for station synchronization, beacon interval indicating the time interval between beacon transmissions, capability information indicating the type of network and its capabilities, service set identifier (SSID) that uniquely identifies the network, supported rates, and various other parameter sets. In some embodiments, the SSID in the beacon frame transmitted by virtual controller 320 includes an identifier which uniquely corresponds to virtual controller 320. In some embodiments, the SSID and/or unique virtual controller identifier get forwarded to other mesh points through a set of intermediate mesh points. For example, such identifiers can be included in the Media Access Control (MAC) header of frames that are forwarded from intermediate mesh points to other mesh points.

Furthermore, FIG. 3A also includes mesh node 355 that requires configuration and management. In this example, mesh node 355 may be configured as a new mesh node in WLAN 350. In such scenarios, embodiments of the present disclosure allow mesh node 355 to automatically provision itself over the air to WLAN 350. In some embodiments, a configuration profile is saved on mesh node 355 after mesh node 355 successfully connects to a mesh portal. If the saved configuration does not allow mesh node 355 to establish a connection to the mesh portal, mesh node 355 starts recovery mode. Note that a saved configuration can nonetheless be invalid. Specifically, a saved configuration may not allow mesh node 355 to connect to the mesh portal for a variety of reasons. For example, mesh node 355 may be configured with an incorrect or outdated pre-shared key (PSK). As another example, mesh node 355 may be moved from one location to another location such that the saved configuration no longer applies to the new location. In other embodiments, mesh node 355 starts recovery mode when no configuration profile exists. For example, mesh node 355 may not have an existing configuration profile when it is a network device shipped from a factory and using factory default settings. Moreover, mesh node 355 may not have an existing configuration profile if the configuration has been cleared for the network device.

Figure 3B:
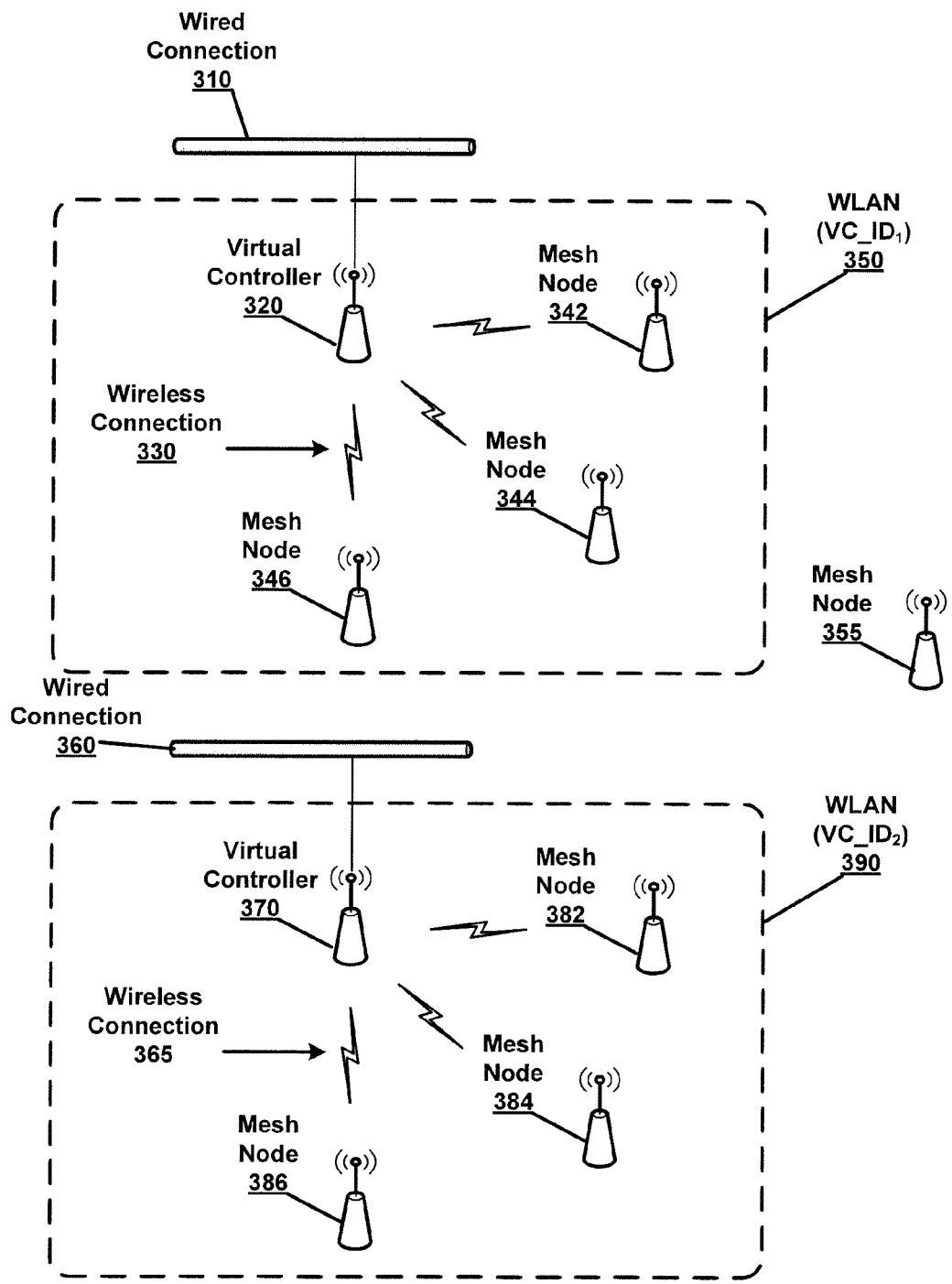
FIG. 3B is a block diagram showing another exemplary wireless mesh network environment for mesh node automatic over the air provisioning according to embodiments of the present disclosure.

FIG. 3B is block diagram showing another exemplary wireless mesh network environment for mesh node automatic over the air provisioning. FIG. 3B includes a plurality of mesh nodes 320, 342, 344, and 346, among which one mesh node is designated as a virtual controller 320. The mesh node designated as virtual controller 320 is a mesh portal having access to a wired network via wired connection 310. Moreover, the mesh nodes 342-346 connect to the wired network through virtual controller 320, and are coupled to virtual controller 320 through a number of wireless network connections 330. Virtual controller 320 periodically transmits beacon frames to other mesh nodes 342-346 to announce the presence of wireless local area network (WLAN) 350, whose corresponding SSID uniquely identifies virtual controller 320. In some embodiments, the SSID includes a unique identifier for virtual controller 320, i.e., $VC\_ID_1$. Note that intermediate mesh nodes such as nodes 342-346 can forward SSID and/or virtual controller identifier ($VC\_ID_1$) to other nearby mesh nodes including mesh node 355 via wireless network connection 330.

Similarly, FIG. 3B also includes a plurality of mesh nodes 370, 382, 384, and 386, among which one mesh node is designated as a virtual controller 370. The mesh node designated as virtual controller 370 is a mesh portal having access to a wired network via wired connection 360. Moreover, the mesh nodes 382-386 connect to the wired network through virtual controller 370, and are coupled to virtual controller 370 through a number of wireless network connections 365. Virtual controller 370 periodically transmits beacon frames to other mesh nodes 382-386 to announce the presence of wireless local area network (WLAN) 390, whose corresponding SSID uniquely identifies virtual controller 370. In some embodiments, the SSID includes a unique identifier for virtual controller 370, i.e., $VC\_ID_2$. Note that intermediate mesh nodes such as nodes 382-386 can forward SSID or virtual controller identifier ($VC\_ID_2$) to other nearby mesh nodes including mesh node 355 via wireless network connection 365. In one embodiment, the SSID includes a one-way hash of the virtual controller identifier, which uniquely identifies the virtual controller in the wireless mesh network. In one embodiment, the disclosed system also derives a pre-shared key (PSK) by performing a one-way hash function on the virtual controller identifier. The PSK is to be shared by mesh nodes (or access points) and their wireless mobile clients to enable secured wireless communications.

Furthermore, FIG. 3B also includes a mesh node 355 that requires configuration and management. In this example, mesh node 355 may be configured as a new mesh node in either WLAN 350 or WLAN 390. In some embodiments, because there are two or more wireless networks that mesh node 355 can connect to, the system will disable automatic over the air provisioning to avoid mesh node 355 connecting to the incorrect WLAN inadvertently. In other alternative embodiments, the system can maintain a log that records the WLAN to which mesh node 355 previously connected to prior to a device failure, and allow automatic over the air provisioning of mesh node 355's connection to the same WLAN after device reboots based on the information provided by such log.

Figure 4:
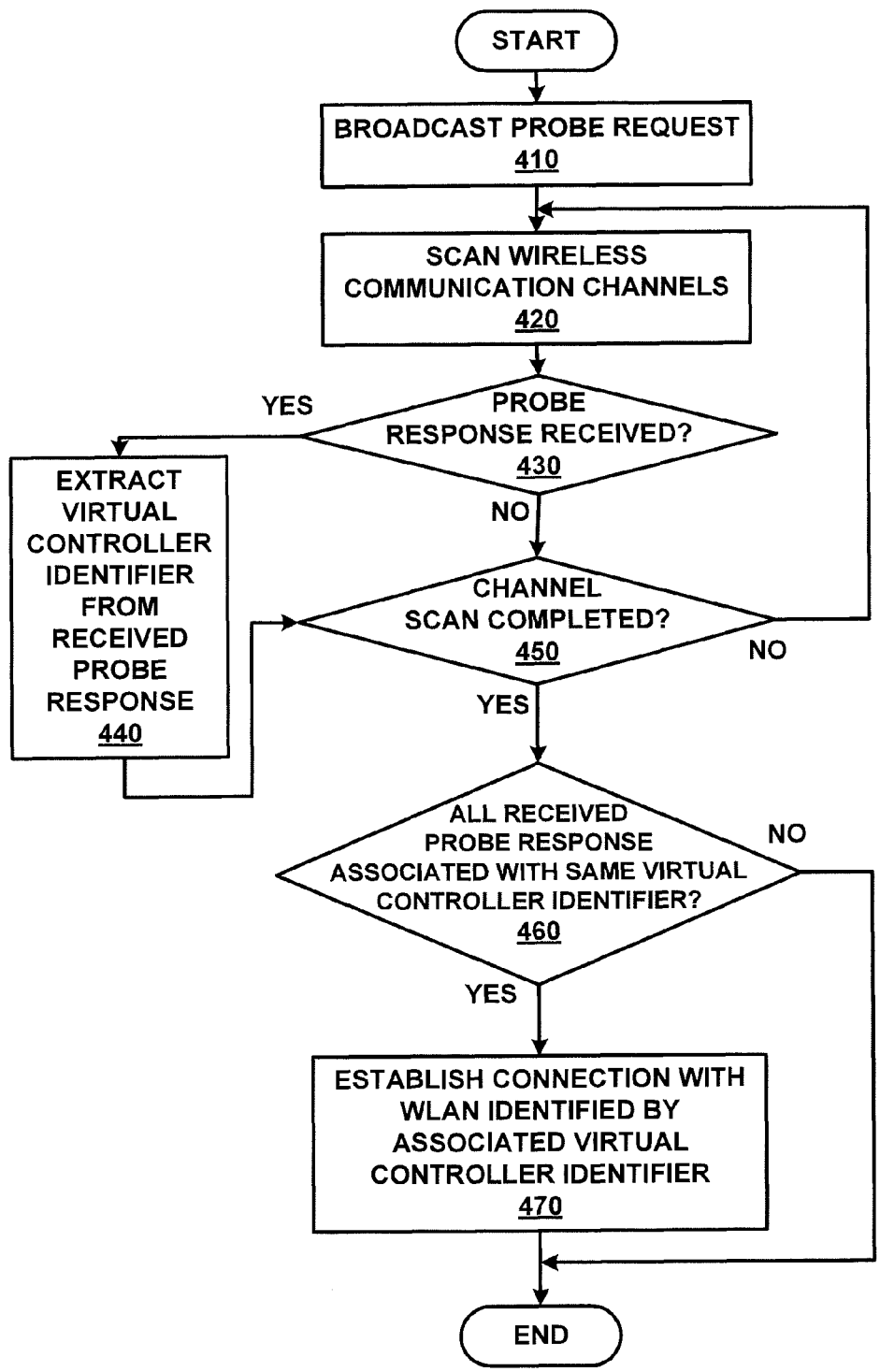
FIG. 4 is a flowchart illustrating mesh node automatic over the air provisioning according to embodiments of the present disclosure.

FIG. 4 is a flowchart illustrating mesh node automatic over the air provisioning according to embodiments of the present disclosure. During operation, a wireless network device as disclosed, which attempts to join a WLAN after system starts up or reboots, broadcasts messages (e.g., its probe requests) to other wireless network devices nearby (operation 410). The disclosed system then scans a plurality of wireless communication channels for response messages (e.g., probe responses) from nearby wireless network devices (operation 420). Note that Next, the disclosed system determines whether a probe response is received in each scanned wireless communication channel (operation 430). If a probe request is received in a specific wireless communication channel, the disclosed system extracts a virtual controller identifier (or a service set identifier) from the received probe response (operation 440). Otherwise, the disclosed system determines whether the wireless communication channel scan is completed (operation 450). If not, the disclosed system continues the scanning process (operation 420) and the determining process (operations 430 and 440) until the disclosed system has completed channel scan (operation 450).

Note that channel scanning can be achieved using either active scanning techniques or passive scanning techniques. Thus, in some embodiments, the system transmits a probe requests and scans for corresponding probe responses. In other embodiments, the system sniffs a beacon frame and retrieves a service set identifier (SSID) or virtual controller identifier from the beacon frame.

After the disclosed system completes the channel scan, it determines whether all received probe responses are associated with the same wireless network identified by a single SSID or virtual controller identifier (operation 460). If so, because it is the only wireless mesh network that the wireless network device can connect to, the disclosed system will allow such wireless network device to automatically establish a connection with the wireless network, which is associated with the solely identified virtual controller identifier (or SSID) (operation 470).

As described above in reference to FIG. 3B, if the disclosed system determines that two or more virtual controller identifiers (or service set identifiers) are extracted from the channel scan, because mesh node 355 can connect to a number of different networks, the system will disable automatic recovery and present a user interface or notification to a user or an administrator to allow for manual configuration of which network that the disclosed wireless network device will connect to. Alternatively, the disclosed system can maintain a log that records the WLAN to which mesh node 355 previously connected to prior to a device failure, and allow automatic recovery of mesh node 355's connection the same WLAN after device reboots based on the information provided by such log.

Mesh Node Role Discovery and Automatic Over the Air Provisioning System

Figure 5:
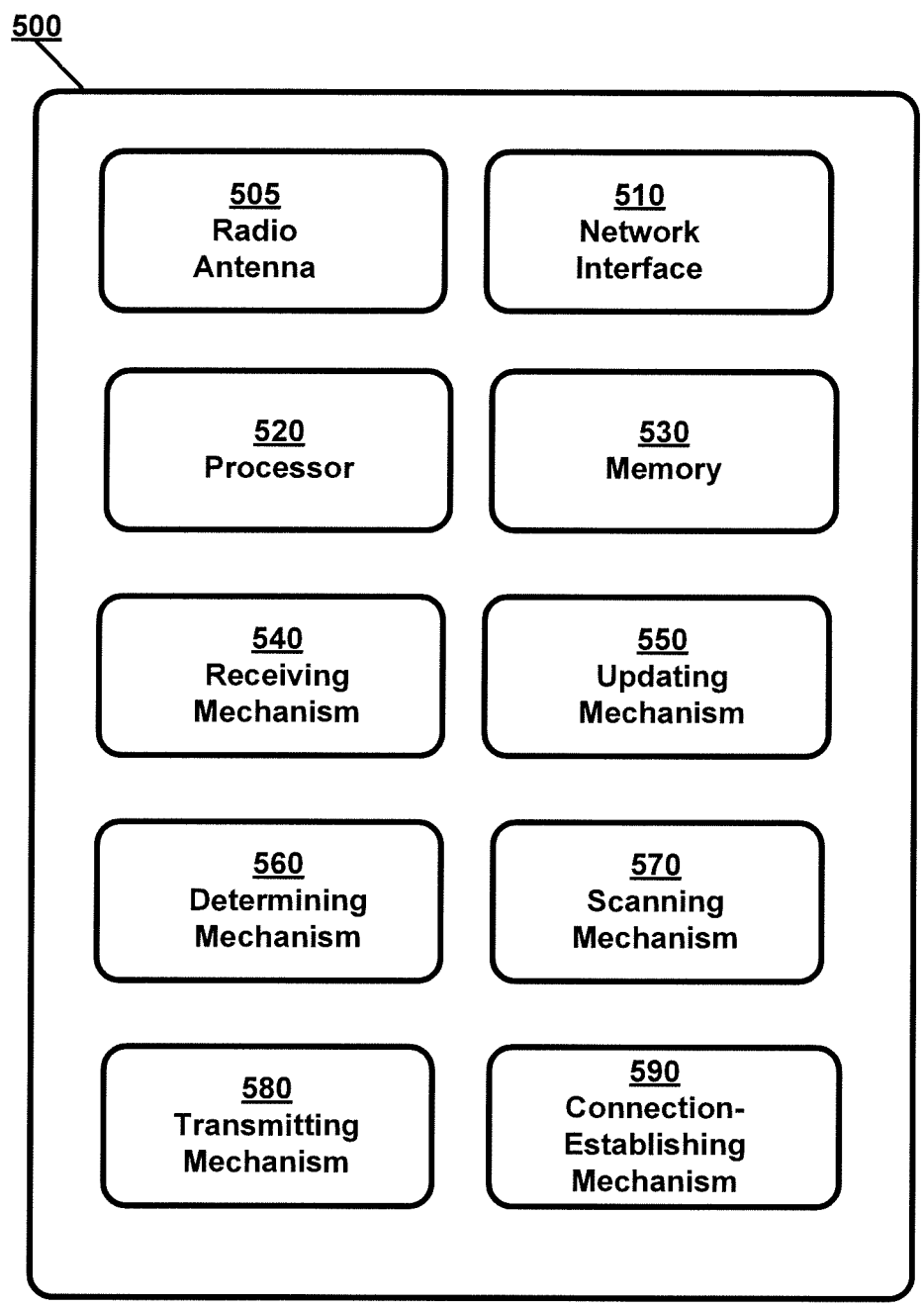
FIG. 5 is a block diagram illustrating a system for mesh node role discovery and automatic over the air provisioning according to embodiments of the present disclosure.

FIG. 5 is a block diagram illustrating a system for mesh node role discovery and automatic over the air provisioning according to embodiments of the present disclosure. Operating as a mesh node in a wireless mesh network, wireless network device 500 includes at least one or more radio antennas 505 capable of either transmitting or receiving radio signals or both, a network interface 510 capable of communicating to a wired or wireless network, a processor 520 capable of processing computing instructions, and a memory 530 capable of storing instructions and data. Moreover, wireless network device 500 further includes a receiving mechanism 540, an updating mechanism 550, a determining mechanism 560, a scanning mechanism 570, a transmitting mechanism 580, and a connection-establishing mechanism 590, all of which are coupled to the processor and the memory in wireless network device 500. Wireless network device 500 may be used as a client system, or a server system, or may serve both as a client and a server in a distributed or a cloud computing environment.

Radio antenna 505 may be any combination of known or convenient electrical components for receipt of signaling, including but not limited to, transistors, capacitors, resistors, multiplexers, wiring, registers, diodes or any other electrical components known or later become known.

Network interface 510 can be any communication interface, which includes but is not limited to, a modem, token ring interface, Ethernet interface, wireless IEEE 802.11 interface, cellular wireless interface, satellite transmission interface, or any other interface for coupling network devices.

Processor 520 can include one or more microprocessors and/or network processors. Memory 530 can include storage components, such as, Dynamic Random Access Memory (DRAM), Static Random Access Memory (SRAM), etc. In one embodiment, memory 530 stores one or more identifiers, where each identifier is uniquely associated with a virtual controller or a service set identifier (SSID) corresponding to a wireless mesh network. The virtual controller can be either a physical or a logical entity capable of processing a set of functionalities in a wireless mesh network. In one embodiment, the SSID includes a one-way hash of the virtual controller identifier, which uniquely identifies the virtual controller in the wireless mesh network.

Receiving mechanism 540 receives one or more wireless signals including responses, such as probe responses, as described in the present disclosure.

Updating mechanism 550 updates tracking information, such as the number of trials or the lapsed time period after each determination of whether an active wired connection exists for a mesh node.

Determining mechanism 560 determines whether an active wired network connection exists for a mesh node in a wireless mesh network. Furthermore, determining mechanism 560 determines a role of the mesh node in the wireless mesh network. In one embodiment, determining mechanism 560 determines the role of the mesh node as a mesh portal in response to the active wired network connection being existed. In another embodiment, determining mechanism 560 determines the role of the mesh node as a mesh point in response to the active wired network connection not being existed. According to embodiments of the present disclosure, the role of a mesh node as a mesh portal in a wireless mesh network indicates that the network device corresponding to the mesh node has direct access to a wired network or maintains an active wired network connection. On the other hand, the role of a mesh node as a mesh point in the wireless mesh network indicates that the network device corresponding to the mesh node must obtain access to the wired network visa one or more other network devices (or mesh nodes) including at least one mesh portal.

In some embodiments, determining mechanism 560 determines whether a pre-defined threshold time period has expired. In other embodiments, determining mechanism 560 determines whether a pre-defined threshold number of trials have been reached. In yet some other embodiments, determining mechanism 560 determines whether a pre-defined threshold number of trials have been reached within a pre-defined threshold time period. According to some embodiments, determining mechanism 560 determines whether an active wired network connection exists in response to determining that a pre-defined threshold time period has not expired, or that a pre-defined threshold number of trials have not been reached, or that a pre-defined threshold number of trials have not been reached within a pre-defined time period.

In some embodiments, determining mechanism 560 determines whether an active wired network connection exists in response to a network device reboot, or in response to the startup of a new network device to be added to the wireless mesh network.

If a network is determined to take the role of a mesh point, according to some embodiments, determining mechanism 560 determines a virtual controller identifier associated with a set of one or more received probe requests. In some embodiments, determining the virtual controller identifier by determining mechanism 560 is in response to receiving one or more probe responses by receiving mechanism 540. In some embodiments, the virtual controller identifier corresponds to a service set identifier (SSID) associated with the wireless network. In one embodiment, the SSID includes a one-way hash of the virtual controller identifier, which uniquely identifies the virtual controller in the wireless mesh network. In one embodiment, a pre-shared key (PSK) is further derived by performing a different one-way hash function on the virtual controller identifier. The PSK is then to be shared by mesh nodes (or access points) and their wireless mobile clients to allow secured wireless communications.

Scanning mechanism 570 scans through a plurality of wireless communication channels for wireless signals, including probe responses according to embodiments of the present disclosure. Note that channel scanning can be achieved using either active scanning techniques or passive scanning techniques. Thus, in some embodiments, for active scanning, the system transmits a probe requests and scans for corresponding probe responses. In other embodiments, for passive scanning, the system sniffs a beacon frame and retrieves a service set identifier (SSID) or virtual controller identifier from the beacon frame.

Transmitting mechanism 580 transmits a wireless message, such as a probe request, according to embodiments of the present disclosure. In some embodiments, transmitting mechanism 580 broadcasts or multicasts wireless messages such as probe requests. In other embodiments, transmitting mechanism 580 transmits the wireless messages to a specific access point, controller, mesh router, or type of other network devices.

Collectively operating with the updating mechanism 560, determining mechanism 570, and transmitting mechanism 580, connection-establishing mechanism 590 establishes a connection to a wireless mesh network corresponding to a virtual controller identifier or an SSID, in response to the received probe responses uniquely being associated with the virtual controller identifier or the SSID.

In some embodiments, determining mechanism 560 further determines a second virtual controller identifier associated with the set of received probe responses. If the second virtual controller identifier is different from previously determined virtual controller identifier, then the set of received probe responses do not uniquely associate with one virtual controller. In some embodiments, responsive to a determined virtual controller identifier not being uniquely associated with the set of one or more received probe responses, connection-establishing mechanism 590 delays establishing the connection to the wireless mesh network until a selection among the determined virtual controller identifiers is received. In some embodiments, the disclosed system receives such selection from a user or administrator via a user interface. In other embodiments, the disclosed system receives such selection based on a pre-configured log containing historic information about network devices and their previously established associations with wireless networks.

The present disclosure may be realized in hardware, software, or a combination of hardware and software. As understood by the art, the hardware platforms as disclosed in the present disclosure may operate under control of target software running under a LINUX-variant operating system, or other operating system suitable for embedded devices. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, "wireless mesh network" (WMN) generally refers to a communications network made up of radio nodes organized in a mesh topology.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is this to be regarded as illustrative rather than limiting.

What is claimed is:

1. A computer implemented method, comprising:
   determining, at a mesh node of a plurality of mesh nodes, whether the mesh node is actively wired to a wired network;
   in response to a determination that the mesh node is actively wired to the wired network:
      determining a role of the mesh node to be a mesh portal, wherein the mesh portal has direct access to the wired network and is a gateway for the wired network;
      transmitting an announcement indicating that the mesh node is providing wireless network access to the wired network;
      transmitting a wireless network identifier associated with the wireless mesh network;
      designating the mesh node as a virtual controller when the role of the mesh node is a mesh portal, wherein designating the mesh node as the virtual controller includes providing the mesh node with additional processing capabilities including IEEE 802.1x authentication not included on a non-designated mesh node to manage firmware and configuration of the wireless network that includes the mesh node acting as the virtual controller and the plurality of mesh nodes; and
      periodically transmitting, by the mesh node acting as the virtual controller, beacon frames to the plurality of mesh nodes in a wireless mesh network, wherein the beacon frames announce a presence of a wireless local area network having a service set identifier that uniquely identifies the mesh node as the virtual controller for the wireless mesh network.

2. The method of claim 1, further comprising re-determining the role of the mesh node as a mesh point or a mesh portal in response to a failure of the mesh node occurring.

3. The method of claim 1, further comprising:
   rebooting the mesh node; and
   re-determining whether the mesh node is actively wired to the wired network following rebooting of the mesh node.

4. The method of claim 1, further comprising:
   in response to a determination that the mesh node is not actively wired to the wired network:
      determining the role of the mesh node to be a mesh point, wherein the mesh point is to connect to the wired network through the mesh portal;
      broadcasting a probe request to discover nearby wireless network devices;
      receiving responses to the probe request;
      determining a wireless network identifier using the received responses;
      establishing a wireless network connection using the wireless network identifier;
      determining a virtual controller identifier using the received responses; and
      establishing a virtual controller connection using the wireless network connection and the virtual controller identifier.

5. The method of claim 4, wherein establishing the wireless network connection includes:
   receiving a wireless network configuration;
   establishing the wireless network connection using the wireless network configuration; and
   using a stored network configuration.

6. The method of claim 4, wherein:
receiving the responses to the probe request includes receiving multiple responses to the probe request;
determining the wireless network identifier includes determining that only a single network identifier is associated with the multiple responses to the probe request; and
establishing the wireless network connection includes establishing the wireless network connection using the single network identifier.

7. The method of claim 4, wherein:
receiving the responses to the probe request includes receiving multiple responses to the probe request;
determining the wireless network identifier includes determining that multiple network identifiers are associated with the multiple responses to the probe request;
determining the wireless network identifier includes determining one network identifier from the multiple network identifiers to use for establishing a wireless connection; and
establishing the wireless network connection includes establishing the wireless network connection using the one network identifier.

8. The method of claim 1, wherein the wireless network identifier associated with the wireless mesh network includes a one way hash of a virtual controller identifier.

9. The method of claim 1, further comprising deriving a pre-shared key for securing wireless communications by performing a one-way hash function on a virtual controller identifier for the wireless mesh network.

10. The method of claim 1, further comprising:
determining that a second mesh node not acting as a virtual controller is to be configured;
connecting the second mesh node to the mesh node acting as a virtual controller; and
in response to successful connection of the second mesh node to the mesh node acting as the virtual controller, storing a configuration of the second mesh node.

11. A system comprising:
A processor;
a non-transitory computer readable medium communicatively coupled to the one or more processors, the non-transitory computer readable medium including instructions that, when executed by the processor causes the processor to:
determine, at a mesh node of a plurality of mesh nodes, whether the mesh node is actively wired to a wired network;
in response to a determination that the mesh node is actively wired to the wired network, cause the mesh node to:
determine a role of the mesh node to be a mesh portal, wherein the mesh portal has direct access to the wired network and is a gateway for the wired network;
transmit an announcement indicating that the mesh node is providing wireless network access to the wired network;
transmit a wireless network identifier associated with the wireless mesh network;
designate the mesh node as a virtual controller when the role of the mesh node is a mesh portal, wherein designating the mesh node as the virtual controller includes providing the mesh node with additional processing capabilities including automatic radio frequency management not included on a non-designated mesh node to manage firmware and configuration of the wireless network that includes the mesh node acting as the virtual controller and the plurality of mesh nodes: and
periodically transmit beacon frames, by the mesh node acting as the virtual controller, to the plurality of mesh nodes in a wireless mesh network, wherein the beacon frames announce a presence of a wireless local area network having a service set identifier that uniquely identifies the mesh node as the virtual controller for the wireless mesh network.

12. The system of claim 11, further comprising instructions to cause the processor to re-determine the role of the mesh node as a mesh point or a mesh portal in response to an occurrence of a failure of the mesh node.

13. The system of claim 11, further comprising instructions to cause the processor to:
reboot the mesh node; and
re-determine whether the mesh node is actively wired to the wired network following reboot of the mesh node.

14. The system of claim 11, further comprising instructions to:
in response to a determination that the mesh node is not actively wired to the wired network:
determine the role of the mesh node to be a mesh point, wherein the mesh point is to connect to the wired network through the mesh portal;
broadcast a probe request to discover nearby wireless network devices;
receive responses to the probe request;
determine a wireless network identifier using the received responses;
establish a wireless network connection using the wireless network identifier;
determine a virtual controller identifier using the received responses; and
establish a virtual controller connection using the wireless network connection and the virtual controller identifier.

15. The system of claim 14, wherein the instructions to establish the wireless network connection include instructions to:
receive a wireless network configuration;
establish the wireless network connection using the wireless network configuration; and
use a stored network configuration.

16. The system of claim 14, wherein;
the instructions to receive responses to the probe request include instructions to receive multiple responses to the probe request;
the instructions to determine the wireless network identifier include instructions to determine that only a single network identifier is associated with the multiple responses to the probe request; and
the instructions to establish the wireless network connection include instructions to establish the wireless network connection using the single network identifier.

17. The system of claim 14, wherein:
the instructions to receive responses to the probe request include instructions to receive multiple responses to the probe request;
the instructions to determine the wireless network identifier include instructions to determine that multiple network identifiers are associated with multiple responses to the probe request
the instructions to determine the wireless network identifier include instructions to determine one network identifier from the multiple network identifiers to use for establishing the wireless network connection; and the instructions to establish the wireless network connection include instructions to establish the wireless network connection using the one network identifier.

18. The system of claim 11, wherein the wireless network identifier associated with the wireless mesh network includes a one way hash of a virtual controller identifier.

19. The system of claim 11, further comprising instructions to cause the processor to derive a pre-shared key for securing wireless communications by performing a one-way hash function on a virtual controller identifier for the wireless mesh network.

20. The system of claim 14, wherein the wireless network identifier uniquely identifies the virtual controller.

21. A non-transitory computer readable medium including instructions that, when executed by a processor, causes the processor to:

determine, at a mesh node of a plurality of mesh nodes, whether the mesh node is actively wired to a wired network;

in response to a determination that the mesh node is actively wired to the wired network, cause the mesh node to:

determine a role of the mesh node to be a mesh portal, wherein the mesh portal has direct access to the wired network and is a gateway for the wired network;

transmit an announcement indicating that the mesh node is providing wireless network access to the wired network;

transmit a wireless network identifier associated with the wireless mesh network;

and designate the mesh node as a virtual controller when the role of the mesh node is a mesh portal, wherein designating the mesh node as the virtual controller includes providing the mesh node with additional processing capabilities including seamless stateful roaming not included on a non-designated mesh node to manage firmware and configuration of the wireless network that includes the mesh node acting as the virtual controller and the plurality of mesh nodes; and periodically transmit, by the mesh node acting as the virtual controller, beacon frames to the plurality of mesh nodes in a wireless mesh network, wherein the beacon frames announce a presence of a wireless local area network having a service set identifier that uniquely identifies the mesh node as the virtual controller for the wireless mesh network.

22. The non-transitory computer readable medium of claim 21, further comprising instructions executable by the processor to re-determine the role of the mesh node as a mesh point or a mesh portal in response to an occurrence of a failure of the mesh node.

23. The non-transitory computer readable medium of claim 21, further comprising instructions executable by the processor to:

reboot the mesh node;

re-determine whether the mesh node is actively wired to the wired network following reboot of the mesh node.

24. The non-transitory computer readable medium of claim 21, further comprising instructions executable by the processor to:

in response to a determination that the mesh node is not actively wired to the wired network:

determine the role of the mesh node to be a mesh point, wherein the mesh point is to connect to the wired network through the mesh portal;

broadcast a probe request to discover nearby wireless network devices;

receive responses to the probe request;

determine a wireless network identifier using the received responses;

establish a wireless network connection using the wireless network identifier;

determine a virtual controller identifier using the received responses; and establish a virtual controller connection using the wireless network connection and the virtual controller identifier.

25. The non-transitory computer readable medium of claim 24, wherein the instructions to establish the wireless network connection include instructions to:

receive a wireless network configuration;

establish the wireless network connection using the wireless network configuration; and use a stored network configuration.

26. The non-transitory computer readable medium of claim 24, wherein:

the instructions to receive responses to the probe request include instructions to receive multiple responses to the probe request; the instructions to determine the wireless network identifier include instructions to determine that only a single network identifier is associated with the multiple responses to the probe request; and the instructions to establish the wireless network connection include instructions to establish the wireless network connection using the single network identifier.

27. The non-transitory computer readable medium of claim 24, wherein:

the instructions to receive responses to the probe request include instructions to receive multiple responses to the probe request;

the instructions to determine the wireless network identifier include instructions to determine that multiple network identifiers are associated with multiple responses to the probe request;

the instructions to determine the wireless network identifier include instructions to determine one network identifier from the multiple network identifiers to use for establishing the wireless network connection; and the instructions to establish the wireless network connection include instructions to establish the wireless network connection using the one network identifier.

28. The non-transitory computer readable medium of claim 21, wherein the wireless network identifier associated with the wireless mesh network includes a one way hash of a virtual controller identifier.

29. The non-transitory computer readable medium of claim 21, further comprising instructions executable by the processor to cause the processor to derive a pre-shared key for securing wireless communications by performing a one-way hash function on a virtual controller identifier for the wireless mesh network.

30. The non-transitory computer readable medium of claim 24, wherein the wireless network identifier uniquely identifies the virtual controller.

* * * * *